Figure 1:
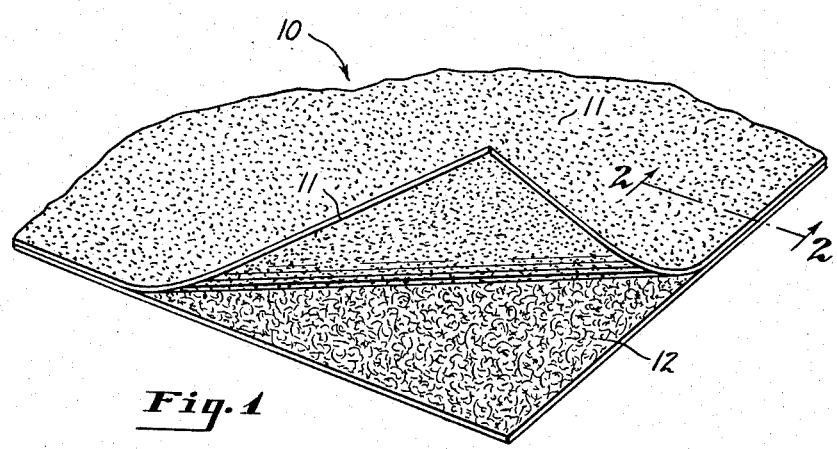

Feb. 24, 1959 DE FOREST LOTT ET AL 2,875,115
PLASTIC UPHOLSTERY MATERIAL
Filed May 19, 1955

INVENTOR
de Forest Lott
Edward G. Hamway
BY Evans + McCoy
ATTORNEYS

United States Patent Office 2,875,115
Patented Feb. 24, 1959

2,875,115

PLASTIC UPHOLSTERY MATERIAL

De Forest Lott and Edward G. Hamway, Toledo, Ohio, assignors to The General Tire & Rubber Company, Akron, Ohio, a corporation of Ohio Application May 19, 1955, Serial No. 509,650

7 Claims. (Cl. 154—46)

This invention relates to sheet materials and more particularly to an article formed of a fibrous web in which the fibers are bonded together and the web coated with a layer of film of resinous material.

Sheet materials have been manufactured utilizing a woven cotton fabric base coated on one or both sides with a suitable film-forming resin, such materials being particularly adaptable for upholstering purposes. Reinforced materials of this character, while having good tensile strength and wear characteristics, have a comparatively low resistance to tear and do not have adequate elastomeric or stretch characteristics to enable the stretching of the material over curved or irregular surfaces such as those encountered in the upholstery field.

Plastic or resinous sheet materials composed of unsupported film or sheet of film-forming resins have also been used for upholstery purposes. These unreinforced plastic sheets, while having more than adequate elastomeric or stretch characteristics to enable them to be satisfactorily stretched over the curved and irregular conours encountered in the regular upholstery field, having exceedingly poor tear characteristics once a point of rupture occurs, very poor cut growth characteristics, and have a tendency for localized stretches and thin spots to occur at corners and irregular surfaces.

It has also been proposed to solve the problem of obtaining a better plastic upholstery material by calendering the fabric directly onto a backing of knitted fabric while the knitted fabric is in a relaxed condition so that it will permit a two-way stretch within definite limits when the calendered fabric is later subject to tension. While such fabrics have been widely used they are difficult to manufacture and control, expensive, and have a very unbalanced degree of stretch in the "course" vs. "wale" direction. They also exhibit a relatively high degree of permanent set after stretching so as to cause them to bag and stretch in use and therefore not to conform permanently to the surface being covered.

Attempts to make good upholstery materials with a felted fiber base by calendering plastic such as polyvinyl chloride composition directly onto the felt have produced upholstery materials which do not satisfactorily overcome all the disadvantages had with the unreinforced plastic material itself. Generally, the felted material either has poor stretch so that the stretch modulus of the reinforced materials is below that required for upholstery or the poor adhesion of the felt to the plastic film permits the plastic to be separated from the felted fibers in regions of high strain as in corners of cushions and the like.

While nylon fibers are individually very strong and backing material composed of nylon fibers and a suitable binder has been proposed and tried, it is very difficult to maintain proper adhesion of the plastic film to the nylon at points subject to localized stress such as corners and the like.

We have found that when the backing material or web is composed of randomly disposed fibers bonded with a cured rubbery bonding agent comprises a mixture of nylon and/or Dacron (a long chain terephthalic acid-ethylene glycol polyester) and/or Orlon (a long-chain polyacrylic) with viscose rayon fibers, it forms a plastic upholstery material which provides the required degree of stretch without causing separation at the points where localized stress occurs.

One object of the present invention is to provide a plastic material utilizing a web or mat of fine staple synthetic fibers arranged or collected in haphazard or random relation and bonded together through the use of cured synthetic rubber having improved elastomeric characteristics and low permanent set without sacrificing high-strength characteristics of the sheet material.

Another object of the invention resides in the provision of a reinforced sheet material wherein fine, high-strength fibers formed of synthetic material are collected in haphazard or random relation to form a thin web or mat which is impregnated with a synthetic rubber or other bonding medium having elastomeric qualities and a film of vinyl resin coating joined to the bonded web to provide a reinforced sheet material having high tear strength characteristics, low permanent set and satisfactory stretch modulus for upholstering purposes.

Still another object of the invention is to provide a web or backing material for plastic upholstery which has high tear strength, adequate stretch for upholstery purposes, and which does not separate from the plastic film when formed around corners and irregular surfaces or otherwise subjected to concentrated stress.

Figure 2:
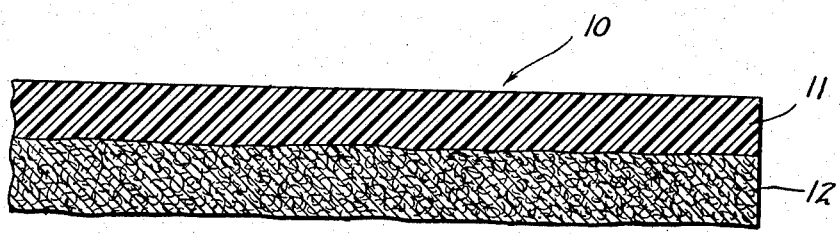

Further objects and advantages of this invention will be apparent from a consideration of the specification and drawing in which:

Figure 1 is a perspective view of the article of the invention with the resin layer partially separated from the fibrous web to illustrate the construction of the article; and Figure 2 is an enlarged cross-sectional view of the article of the invention taken on line 2—2 of Fig. 1 showing the fibrous web layer and resin layer.

Referring to the drawing, the article of manufacture or sheet material 10 comprises a web or mat 12 comprising a mixture of fine staple fibers formed of synthetic fiber-forming material and viscose rayon held together with a cured synthetic rubber binder bonded to a resin layer 11 of polyvinyl chloride resin or the like. In the preferred web, more than one half of the fibers are nylon, viz, linear fiber-forming polymeric amides, terephthalic acid polyesters, or other type of high strength polymeric synthetic of this general character, the remainder comprising viscose rayon fibers. Viscose rayon, while considered a synthetic fiber, originates from regenerated cellulose as distinct from the high strength polymeric synthetics such as nylon, Orlon, Dynel, Dacron etc. Viscose rayon has a low order of tenacity or strength of about 1.2–1.5 grams per denier as compared with 4–6 grams per denier for the high strength polymeric fibers referred to herein.

In the formation of the mat or web 12 the staple fibers preferably having lengths of ¾″ or 1″ or more and deniers of 1½ or more are collected and deposited in haphazard or random relationship and bonded together in a thin sheet whereby the mat or web is of a loose character with the fibers extending in all directions, both in the plane and elevation of the sheet. The sheet is porous similar to woven textile fabric and is not dense, thick, and compressed as are conventional felts. The mat or unwoven web of nylon or other strong, light-weight synthetic fibers may be made comparatively thin, providing high strength characteristics with a minimum of fiber weight.

The nylon fibers or other fine, high-strength, synthetic fibers are, for general purposes, usually mixed with viscose rayon fibers in amounts constituting from 15 to 25 up to around 50 percent rayon by fiber weight of the mat. Surprisingly, the mixture of fine synthetic fibers and viscose rayon fibers provides the strongest mat and composite article. The presence of a portion of viscose rayon fibers in the web facilitates and improves adhesion of the binding agent to the fibers and of the surface film to the web, the high strength synthetic polymeric fibers and the viscose rayon fibers interacting with each other, the bonding medium, and the resin film so as to be superior to an all polymeric synthetic fiber mat.

The fibers of the web or mat are bonded or joined interse by a suitable bonding agent or medium having elastomeric characteristics. The binder may be a curable synthetic rubber per se or a curable blend of synthetic rubber and vinyl resin compounded therewith. Preferable bonding agents are vulcanizable or curable rubbery copolymers of a conjugated diolefine having less than seven aliphatic carbon atoms such as butadiene 1,3 and acrylonitrile, methacrylonitrile or methyl isopropenyl ketone. Other bonding agents such as any of the GRS (butadiene-styrene) rubbers, natural rubbers and other curable rubberlike materials may also be used. The bonding agent must be cured so as to maintain its rubbery, elastomeric properties when calendered and bonded to the vinyl resin layer and otherwise provide elasticity without permanent set. The bonding agent is of course suitably compounded with a curing agent such as sulfur, accelerators, and other suitable additives as is well known in the art so as to cure up at elevated temperatures or even room temperatures as desired.

The resultant web contains from 35 to 65 parts, preferably around 50 parts, of binder or bonding agent for each 100 parts of rayon and synthetic fiber. The elongation at break of the web or mat so formed should be at least 30 percent and preferably around 45 to 60 percent. The tensile strength of 2¼ ounce per square yard weight web is preferably around 22 pounds when tested in accordance with A. S. T. M. standard test method D39–49 and that of 4 ounce per square yard weight web is preferably around 45 pounds.

It is thus apparent that the fiber web or mat of the present invention is strong, light weight, and relatively elastic. Because of the cured rubbery binder, it is also characterized by low permanent set so that when stretched within its elastic limit it returns to its original dimensions.

An additional advantage of the web is its uniform stretch characteristics so that it has substantially equal strength in all directions. This greatly facilitates cutting and stretching problems when the composite article is assembled in upholstery and the like because it does not have to be cut along the bias as with woven textile fabric web or base material. It also provides for improved physical characteristics when perforated. Also a thinner, lighter weight resin layer may be used with the subject web to provide tear strength equal or superior to that of heavier material with a woven fabric base. Since there is no defined pattern to the fibers in the web, no clothiness appears when the material is stretched and otherwise subjected to normal wear and tear and it is possible to obtain a much sharper grain definition in light weight coatings because of the soft formation of the web.

In the article of the present invention the bonded web or mat of fibers or synthetic material is utilized as a base or reinforcement for a film or layer of resinous material 11. The resinous film may be a vinyl resin composition suitably plasticized and stabilized to provide desirable electromeric characteristics. Resin films of this character which are unsupported may have a stretch modulus up to as much as 300 percent, which is greatly in excess of the degree of stretch necessary or desirable in an upholstering material. The fibrous mat, wherein the fibers are held together by a cured rubber-like bonding agent, is endowed with stretch characteristics in excess of the stretch desired for upholstering purposes. It has been found that when a film of resinous material of the above-mentioned character is calendered on or joined to one or both major faces or surfaces of the fibrous web the stretch modulus of the composite article is greatly reduced as compared with the stretch modulus of the bonded web and the resin film by themselves.

A suitable synthetic rubber or a blend of synthetic rubber and compounded vinyl resin may be used as a bonding medium or agent for the mat or web of fibers. For example, butadiene-acrylonitrile, chlorobutadiene, butadiene-styrene or Butyl rubber may be used. The synthetic rubber compositions may be blended with vinyl resin such as a copolymer of vinyl chloride and vinyl acetate, vinylidene chloride or similar resins which are compatible with the synthetic rubber to form a bonding agent which will set at normal temperatures.

The resinous constituents or component of the article is preferably of a character which will be rendered plastic at temperatures from 200° to 400° F. and which may be applied by conventional calendering methods. As a suitable resinous film or coating composition, materials selected from the following may be used: polyvinyl chloride, copolymers of vinyl chloride and vinyl acetate (Vinylite), and copolymers of vinyl chloride, polyvinylidene chloride, and mixtures thereof, as well as copolymers of vinyl chloride, polyvinylidene chloride, diethyl maleate or vinyl acetals such as polyvinyl butyral. Other resinous or rubberlike compounds commonly called plastic capable of being formed into thin pliable films or sheets and being bonded to the web may also be used. While application of the film or layer to the web by calendering methods is preferred, it is to be understood that, if desired, the film or layer of material may be applied by doctor blade or other methods.

The following is the composition of a typical example of the resin layer or film component of the composite article or sheet material of the present invention which has desirable stretch modulus and high-strength characteristics suitable for general upholstering purposes. The resin layer or film component is as follows:

| | |
|---|---|
| Vinyl resin | 100.0 |
| Dioctyl phthalate | 20.0 |
| Octyl/decyl phthalate | 20.0 |
| Plastolein 9720 (a complex fatty-acid ester) | 10.0 |
| Paraplex G–50 (a high molecular weight polyester) | 10.0 |
| Filler (calcium carbonate) | 10.0 |
| Pigment | 8.0 |
| Basic lead carbonate | 3.0 |
| Fused lead stearate | 1.0 |
| | 182.0 |

The above constituents are set forth in parts by weight in the resin layer composition. The vinyl resin constituent in the above composition may be polyvinyl chloride or copolymers containing a minor portion (for example, 5%) of copolymerized monomer such as vinyl acetate, vinylidene chloride or diethyl maleate. The vinyl chloride component of the resin in the specific example given above may vary from 92% to 95% and the minor proportion of a copolymerized monomer may range between 8% and 5%. Resins of the character hereinbefore mentioned may also be used as the resin layer of the article.

In the foregoing example, the dioctyl phthalate and octyl/decyl phthalate, Plastolein 9720 and Paraplex G–50 form the plasticizing agents in the resin composition and may be substituted in whole or in part by other plasticizer. The basic lead carbonate and fused lead stearate provide the stabilizers in the specific composition given above and may be substituted in whole or in part as is well known by other stabilizing agents.

The film, layer or coating of resin composition is calendered on one side of the mat or web 12 and can be varied from .003" in thickness to .025" thickness or more depending on the end use requirements of the material being manufactured. The calendering step is carried on at a temperature of from 200° F. to 400° F., rendering the resin composition plastic, and the resin in such condition is joined through its inherent adhesive characteristics to the bonded fibrous mat or web 12. It is to be understood that the resin film may be preformed as an independent sheet and the sheet adhesively joined to the web or mat by suitable bonding compositions, for example, any one of the compositions of bonding agents hereinbefore mentioned, utilized for providing mass integrity or interbond of the fibers of the web or mat.

The sheet material of this invention is of light weight and has high resistance to tear. As previously stated herein, an unsupported vinyl resin film normally has a very high stretch modulus. In the composite sheet material of this invention, the fibrous mat or web, being joined or bonded to the resin film, greatly reduces the stretch modulus of the composite sheet as compared with that of an unsupported vinyl resin film or the bonded web of fibers per se. It has been found that the stretch modulus of the composite sheet of the invention composed of a bonded web as described, weighing 2¼ ounces per square yard to which has been applied a vinyl resin composition film .018″ thick, has a stretch modulus of about 37%. Other weights of film applied on varying weights of web show a stretch modulus of 25% to 60%. The test method used to determine stretch modulus figures quoted is as follows: A test specimen 9″ long and 3″ wide is cut with the 9″ dimension running in the desired direction of the test. A line 3″ long is marked near the center of the test specimen running parallel to the 9″ direction of the specimen.

The specimen is held between two pairs of jaws each placed 1″ from each end of the specimen and perpendicular to the long direction. The jaws must be a minimum of 3″ wide. A total load of 27 lbs., which includes the weight of the lower jaw, is applied to the specimen. The long dimension of the specimen being parallel to the direction of the application of the load. The sample is suspended vertically with the load for a period of 10 minutes. At the end of this period, and while the sample is still under tension, measure the increased length of the 3″ line. Calculate the increased length as percent stretch as follows:

$$\text{Percent stretch} = \frac{\text{increased length under tension} \times 100}{\text{original length}}$$

This degree of stretch in the material is adequate for most upholstering purposes where it is necessary to stretch or tension the material around curves and irregular contours. The fibers of the mat or web being arranged in haphazard relation provides for limited stretch in all directions within the limits of the bonding medium so that the article or composite sheet material of this invention may be tensioned and stretched in any direction as there are no continuous threads or filaments as in films supported by a woven cotton fabric or woven fabrics of other materials which necessarily limit the stretch in the direction of the threads of a woven fabric.

Further illustrating the invention, a vinyl resin film .018 inch thick of the composition of Example 1 was calendered onto a web with 55 parts of nylon and 45 parts rayon, said web weighing 2¼ ounces per square yard having a cured butadiene 1,3-acrylonitrile copolymer binder. This sheet had tensile strength at break of 83 pounds in one direction and in a direction perpendicular thereto 82 pounds, a trapezoid tear strength of 35.4 in one direction and in a direction perpendicular thereto 32.8 lbs. when tested in accordance with A. S. T. M. standard test D39–39–C, and stretch modulus of 28 in one direction and in a direction perpendicular thereto 37 percent. A comparable sheet with a thicker, heavier, woven fabric backing a vinyl resin film .014 inch thick likewise of the composition of Example 1 had a tensile strength at break of 120 pounds in one direction and in a direction perpendicular thereto 110 pounds, a trapezoid tear strength of 8 in one direction and in a direction perpendicular thereto 11.6 lbs., and substantially no elongation at break. The latter sheet weighed slightly more per square yard than the sheet of the present invention.

This application is a continuation-in-part of application Serial No. 423,997, filed April 19, 1954, now abandoned.

It is apparent that, within the scope of the invention, modifications and different arrangements may be made other than is herein disclosed, and the present disclosure is illustrative merely, the invention comprehending all variations thereof.

What we claim is:

1. An article of manufacture comprising (a) a sheet-like web of one layer containing staple fibers formed of a mixture of at least 35 percent of fiber weight of fine high-strength polymeric synthetic fibers and at least 15 percent of fiber weight of viscose rayon fibers bonded together with at least 35 percent of fiber weight of a cured stretchable polymer of a diolefinic compound, said web being relatively porous and having a stretch modulus of at least 25 percent and having the fibers disposed in haphazard relation (b) a plasticized and filled resinous film adhered to at least one side of said web, the resinous portion of said film being selected from the group consisting of polyvinyl chloride, copolymers of vinyl chloride and vinyl acetate, polyvinylidene chloride, copolymers of vinyl chloride and vinylidene chloride, and mixtures thereof.

2. The article of claim 1 in which the polymeric synthetic fibers are formed of linear, fiber-forming polymeric amides and the polymer is a copolymer of butadiene 1,3 and acrylonitrile.

3. The article of claim 1 in which the polymeric synthetic fibers are formed of linear, fiber-forming polymeric amides and the polymer is a copolymer of butadiene 1,3 and methyl isopropenyl ketone.

4. An article of manufacture comprising a plasticized and filled resinous film, the resinous portion of said film being selected from the group consisting of polyvinyl chloride, copolymers of vinyl chloride and vinyl acetate, polyvinylidene chloride, copolymers of vinyl chloride and vinylidene chloride, and mixtures thereof, backed and supported by a sheet-like web of one layer containing staple fibers randomly dispersed therein, said web formed of a mixture of at least 50 percent of fiber weight of fine high-strength polymeric synthetic fibers and at least 15 percent of fiber weight of viscose rayon fibers bonded together with at least 35 percent of fiber weight of a cured polymer of a diolefinic compound, said web having a stretch modulus of at least 25 percent, said film being adhered over one of its entire surfaces to said web of staple fibers.

5. An article of manufacture comprising a plasticized and filled resinous film, the resinous portion of said film being selected from the group consisting of polyvinyl chloride, copolymers of vinyl chloride and vinyl acetate, polyvinylidene chloride, copolymers of vinyl chloride and vinylidene chloride, and mixtures thereof, embedded in and backed with a sheet-like web of one layer containing staple fibers randomly dispersed therein, said web formed of a mixture of at least 50 percent of fiber weight of fine high-strength polymeric synthetic fibers and at least 15 percent of fiber weight of viscose rayon fibers bonded together with at least 35 percent of fiber weight of a cured polymer of a diolefinic compound, said web having a stretch modulus of at least 25 percent and an elongation at break of at least 30 percent, said film being adhered over one of its entire surfaces to said web of staple fibers.

6. An article of manufacture comprising a plasticized and filled polyvinyl chloride film, embedded in and backed with a sheet-like web of one layer containing staple fibers randomly dispersed therein, said web formed of a mixture of at least 50 percent of fiber weight of fine high-strength polymeric synthetic fibers and at least 15 percent of fiber weight of viscose rayon fibers bonded together with at least 35 percent of fiber weight of a cured polymer of a diolefinic compound, said web having an elongation at break of at least 45 percent, said film being adhered over one of its entire surfaces to said web of staple fibers.

7. An article of manufacture comprising a plasticized and filled resinous film, the resinous portion of said film being selected from the group consisting of polyvinyl chloride, copolymers of vinyl chloride and vinyl acetate, polyvinylidene chloride, copolymers of vinyl chloride and vinylidene chloride, and mixtures thereof, embedded in and backed with a sheet-like web of one layer containing staple fibers randomly dispersed therein, said web formed of a mixture of at least 50 percent of fiber weight of fine high-strength polymeric synthetic fibers and at least 15 percent of fiber weight of viscose rayon fibers bonded together with at least 35 percent of fiber weight of a cured polymer of a diolefinic compound, said web having a trapezoidal tear strength of at least about 32 pounds in one direction and 32 pounds in another direction when a web weighing 2¼ ounces per square yard is tested in accordance with A. S. T. M. D39–39–C, said film being adhered over one of its entire surfaces to said web of staple fibers.

References Cited in the file of this patent

UNITED STATES PATENTS

| | | |
|---|---|---|
| 2,396,125 | Price | Mar. 5, 1946 |
| 2,700,630 | Bukey et al. | Jan. 25, 1955 |
| 2,719,806 | Nottebohm | Oct. 4, 1955 |
| 2,725,309 | Rodman | Nov. 29, 1955 |
| 2,777,788 | Bragg | Jan. 15, 1957 |

OTHER REFERENCES

"Non-Woven Fabrics, a New Textile Material," by Dr. C. E. Cook, published in the Textile Manufacturer, August 1956, pages 409–411.